R. C. Robbins,
Pipe Coupling,
No. 2,312. Reissued Aug. 28, 1866.
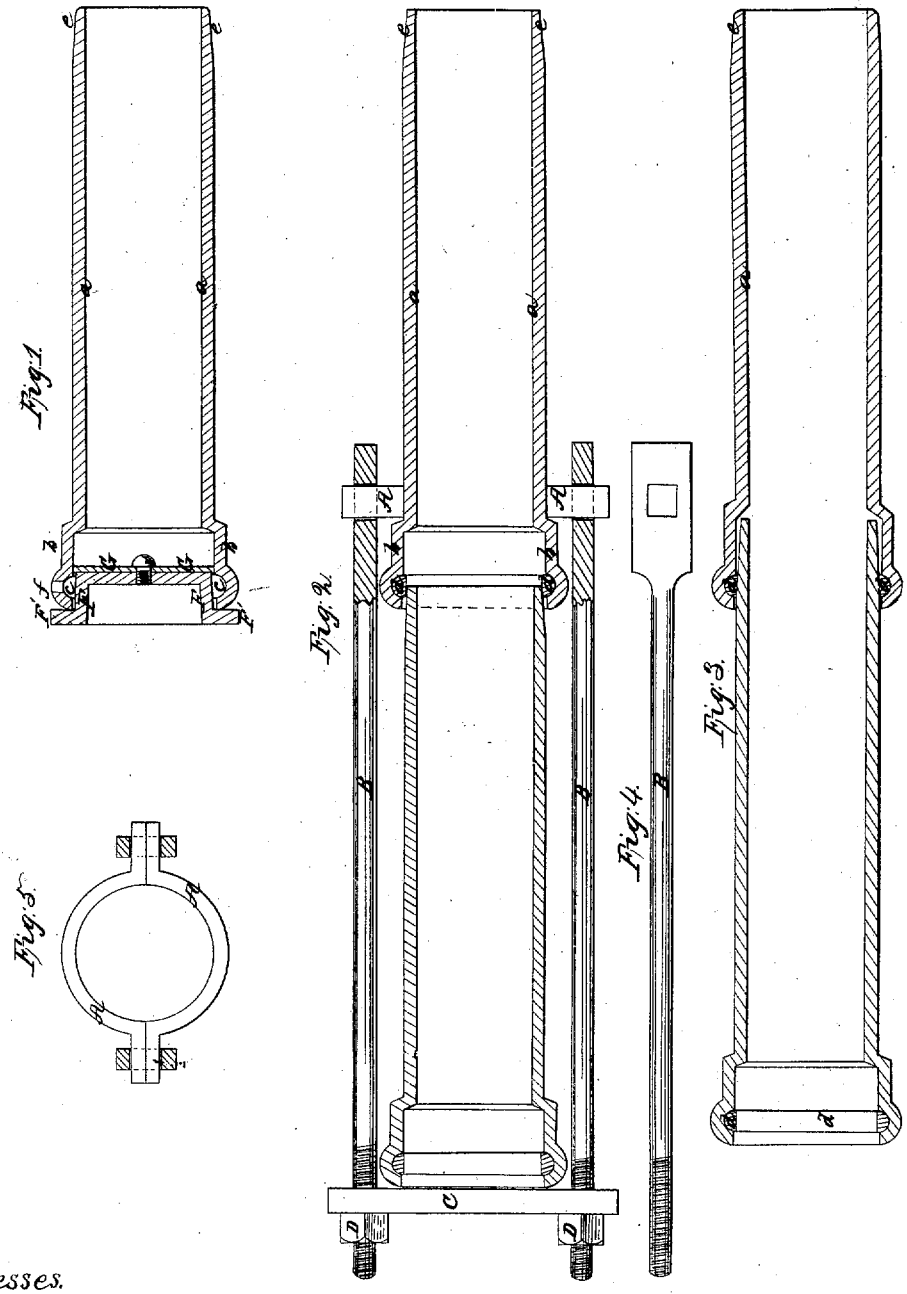
Witnesses.
George W. Kerr
Albert H. Stowe
N. PETERS, PHOTO-LITHOGRAPHER, WASHINGTON, D. C.

UNITED STATES PATENT OFFICE.

HENRY L. CASE, OF JERSEY CITY, NEW JERSEY, (ADMINISTRATOR OF THE ESTATE OF RICHARD C. ROBBINS, DECEASED,) HENRY L. CASE AND JESSE M. KEEN, OF SAME PLACE, AND JOHN W. MASON, OF BROOKLYN, NEW YORK, ASSIGNEES OF SAID RICHARD C. ROBBINS, DECEASED.

IMPROVEMENT IN GAS-PIPE JOINTS.

Specification forming part of Letters Patent No. 37,425, dated January 13, 1863; Reissue No. 2,342, dated August 28, 1866.

*To all whom it may concern:*

Be it known that RICHARD C. ROBBINS, of Jersey City, in the county of Hudson and State of New Jersey, did invent a certain Improvement in Joints for Pipes, of which the following is a specification.

This invention is designed to form a more perfect joint for that class of pipes usually made of cast-iron, which is generally used for the conveyance of gas and water through the streets of cities, and known as "gas and water mains," and for other similar purposes.

The construction which has been most commonly employed in making and joining these pipes involves a very large expenditure of lead in packing the joints, and at the same time makes such a joint as is quite liable to subsequent leakage by its deflection from the line in which it was originally laid, to which deflection pipes of this kind are more or less subject.

This invention consists in forming the larger or socket end of the pipe, or rather of a length of the pipe, with a complete groove extending around the inside of the said socket, and so made as to retain the packing-ring in three directions — namely, radially, longitudinally toward the small or plug end of the pipe, and longitudinally toward the outer end of the socket — casting a soft-metal ring into this groove, making the small entering or plug end of the pipe conical, the smaller diameter being at the extreme end, and driving the plug end of one section of the pipe into the packing-ring in the socket end of the next section, so as to compress said packing-ring, all these features of construction being combined to form a perfect compensating sleeve or circular wedge-joint, as hereinafter more fully set forth.

Figure 1 of the accompanying drawings represents a longitudinal axial section of a length of pipe constructed to carry out this improvement, ready to receive the packing-ring, and also shows an inside former or mold designed to be used in casting in the said packing. Fig. 2 represents two lengths or sections of pipe with the packing-rings already supplied and ready to be put together to form the joint between them. It also shows an appliance for forcing the plug end of one of the pieces of pipe into the packing-ring contained in the socket end of the other to complete the joint. The pipe and parts of the apparatus are also shown in section in this figure. Fig. 3 shows the joint complete. Figs. 4 and 5 are detail views of parts of the apparatus used for driving the pipes together to complete the joint.

*a* represents a section or piece of pipe. Each of these sections or lengths is formed with an enlargement or socket, *b*, at one end, similar in most respects to those usually employed in the ordinary construction, but with the addition of a groove, *c*, to receive the packing-ring. This groove is represented as being made semicircular in its section; but it may be made of any form desired, so long as it retains the lead from escaping in either of three directions — namely, outwardly, or in either direction longitudinally; but it must be so formed as to comply with these requisites, at least so far as the bulk of the packing is concerned, though, of course, a little space must be left between the sides of the socket and the plug end of the pipe when inserted, as shown in the drawings.

The mode of casting in the soft-metal packing-ring, which is usually of lead, is as follows: An inside former or mold, F, with a flange, F′, at the outer end and an india-rubber disk, G, at the inner end, and made conical at the point where the lead is to be cast upon it, is inserted in the socket end of the pipe, and lead or other soft metal poured in around it to form the packing-ring, the flange F′ preventing the lead from escaping outwardly, and the india-rubber disk preventing its escaping inwardly.

Fig. 1 represents a hole, *f*, made through the side of the pipe, for pouring the lead into the groove *c*; but it is obvious that other contrivances for admitting the lead may be employed. By this means the packing-ring *d* (represented in Figs. 2 and 3) is formed in the socket end of the pipe, as shown.

The plug end of the pipe is made conical, as shown at *e*, the smaller end of the cone being at the extreme end of the pipe.

To secure perfection of workmanship the conical plug end of the different sections or lengths, and also the sockets, should be uniform in size and true, which may be accomplished by the use of iron molds or chills in the casting of these parts. The internal diameter of the lead rings should also conform to the same conditions, as they, of course, will do when made in the manner above described. These packing-rings should also be made of the same taper as the plug end of the pipe, and should be a trifle smaller than that part of the said plug end which they are intended to fit—say just large enough to allow the extreme end of the plug to enter readily. The pipes may be all prepared and provided with the packing-rings, as aforesaid, at the factory, and this will be found to be much the most convenient mode.

The separate sections or lengths of pipe having been thus prepared are ready to place in the ditch, and when so placed the joints are completed by driving the plug end of one section into the packing-ring in the socket end of the contiguous section, as shown in Fig. 3, by which operation the lead is so compressed as to perfectly and snugly fit both the groove and the plug and entirely prevent any danger of leakage.

An apparatus is represented in Figs. 2, 4, and 5 which may be used to put the sections together, though it is obvious that other devices may be employed. In these figures A A are two halves of a ring intended to surround the pipe near the socket, as shown, said ring being made in halves to allow its ready removal after the operation is completed, and having projecting arms to enter the rods or bolts B, which are provided with mortises to receive them. These rods B extend at their other ends through the bar C, which rests against the outer end of the length of pipe to be driven home, and are provided with nuts D, for forcing the pipe into place.

It will be observed that the construction above described has the several advantages, that it requires only about one-third of the lead required in the ordinary construction; that all the work of forming the joint except the operations of driving the sections together may be performed at the factory, thereby avoiding the necessity of casting in the packing in the ditch after the pipes are laid; that the lead being compressed upon the parts forms a more perfect and reliable joint than if merely cast into place, and that the pipe will bear a greater deflection without leakage than the ordinary construction, this latter effect being probably aided by the circular form which is given to the section of the groove into which the packing is cast, and yet at the same time, while possessing these advantages, requires no more parts than the ordinary construction.

We claim as the invention of the said RICHARD C. ROBBINS—

A joint for gas and other similar pipes constructed in the manner hereinabove described—that is to say, the socket end of a length or section of pipe having a groove formed in it capable of retaining the packing in three directions, as set forth, a packing-ring of soft metal being cast into the said groove, and the plug end or entering end of the adjoining length or section of pipe being made conical and driven into the packing, substantially as hereinbefore described, and the said joint being composed of three parts only, as set forth.

HENRY L. CASE,
*Administrator of the estate of Richard C. Robbins.*

HENRY L. CASE.
JESSE M. KEEN.
JOHN W. MASON.

Witnesses:
J. P. TOWNSEND,
THOS. P. HOW.